(12) United States Patent
Toake et al.

(10) Patent No.: US 10,172,338 B2
(45) Date of Patent: Jan. 8, 2019

(54) DUAL-BEARING REEL

(71) Applicant: Shimano Inc., Sakai, Osaka (JP)

(72) Inventors: Yohei Toake, Osaka (JP); Kunio Takechi, Osaka (JP); Takeshi Ikuta, Osaka (JP); Hirokazu Hiraoka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/801,089

(22) Filed: Nov. 1, 2017

(65) Prior Publication Data

US 2018/0199557 A1    Jul. 19, 2018

(30) Foreign Application Priority Data

Jan. 19, 2017 (JP) .................. 2017-007309

(51) Int. Cl.
*A01K 89/01* (2006.01)
*A01K 89/033* (2006.01)

(52) U.S. Cl.
CPC .................. *A01K 89/046* (2015.05)

(58) Field of Classification Search
CPC .............. A01K 89/015; A01K 89/0192; A01K 89/01931; A01K 89/016
See application file for complete search history.

(56) References Cited

U.S. PATENT DOCUMENTS

| | | | |
|---|---|---|---|
| 5,372,325 A | 12/1994 | Uehara et al. | |
| 2006/0006267 A1* | 1/2006 | Hirayama | A01K 89/0192 242/223 |
| 2010/0006690 A1* | 1/2010 | Takechi | A01K 89/0192 242/396.5 |
| 2013/0193250 A1* | 8/2013 | Ikebukuro | A01K 89/01903 242/261 |
| 2013/0233957 A1* | 9/2013 | Niitsuma | A01K 89/02 242/285 |
| 2015/0090825 A1* | 4/2015 | Ikebukuro | A01K 89/015 242/322 |
| 2016/0106083 A1* | 4/2016 | Niitsuma | A01K 89/0192 242/310 |

FOREIGN PATENT DOCUMENTS

JP          5-55875 U          7/1993

* cited by examiner

*Primary Examiner* — Emmanuel M Marcelo

(74) *Attorney, Agent, or Firm* — Global IP Counselors, LLP

(57) ABSTRACT

A dual-bearing reel includes a reel body and a spool. The reel body includes a first side plate, a second side plate, and a connecting portion connecting the first and second side plates. The spool includes a bobbin trunk, a first flange portion, and a second flange portion. The first flange portion is disposed on a first side plate side of the bobbin trunk, and has a diameter larger than the diameter of the bobbin trunk and a first cylindrical surface disposed face to an inner perimeter portion of the first side plate and extends toward the first side plate side. The second flange portion is disposed on a second side plate side of the bobbin trunk and has a diameter larger than the diameter of the bobbin trunk. The first side plate has a groove portion recessed radially outwardly in at least a portion of an inner perimeter portion.

6 Claims, 5 Drawing Sheets

DUAL-BEARING REEL

CROSS-REFERENCE TO RELATED APPLICATIONS

This application claims priority to Japanese Patent Application No. 2017-007309, filed on Jan. 19, 2017. The entire disclosure of Japanese Patent Application No. 2017-007309 is hereby incorporated herein by reference.

BACKGROUND

Field of the Invention

The present invention relates to a dual-bearing reel.

Background Art

In a dual-bearing reel, a so-called thumbing operation is well known, in which the rotation of the spool is suppressed by bringing a finger in contact with a flange portion of the spool. The thumbing operation is used to prevent backlash, for line control of fishing line, and also in interactions with fish.

In order to smoothly and easily carry out this thumbing operation, some conventional reels include a thumbing space disposed on a portion of the reel body by cutting out an outer edge of the flange of the spool. For example, in Japanese unexamined utility model application publication No. 5-55875, a portion of the side plate of the reel body is cut out to secure a thumbing space.

As shown in Japanese unexamined utility model application publication No. 5-55875, some conventional reels include a thumbing space that is secured by cutting out a portion of the side plate of the reel body. Depending on the shape, etc., of the reel body or the spool, in these types of reels, in the portions other than the thumbing space, the distal end of the flange portion of the spool that is disposed to face the inner perimeter portion of the reel body is formed to be long in the axial direction, so that the area where the side plate of the reel body and the flange portion overlap with a slight gap is increased.

A slight gap is disposed between the side plate of the reel body and the flange portion of the spool so that they do not come into contact with each other, and if seawater enters this gap, a water film is formed between the side plate of the reel body and the flange portion. Consequently, if the area where the side plate of the reel body and the flange portion overlap in the axial direction is increased, the area in which the water film is formed between the side plate of the reel body and the flange portion also increases. As a result, not only does the amount of water film between the side plate of the reel body and the flange portion increase, but there are also cases in which water film continues to be formed, and seawater, etc. remains.

The moisture of this water film of seawater then dries (evaporates) and only the solute, which is mainly salt, remains (crystallizes), in the portion where the side plate of the reel body and the flange portion of the spool overlap in the axial direction. These crystals create friction between the spool and the reel body, leading to a reduction in the rotation performance of the spool. Furthermore, the crystals can damage the spool and the reel body, and cause peeling of the surface treatment, rust, and the like. In addition, if the state in which water film continues to be formed persists, there is the risk that the water film formed in the gap between the side plate of the reel body and the flange portion will act as a flow channel for seawater, etc., so that seawater, etc., intrudes into the reel body.

SUMMARY

The object of the present invention is to reduce the area in which the water film forms between the flange portion of the spool and the reel body.

The dual-bearing reel according to one aspect of the present invention comprises a reel body and a spool. The reel body comprises a first side plate, a second side plate that is spaced apart from the first side plate in the axial direction, and a connecting portion that connects the first side plate and the second side plate. The spool, rotatably supported in the reel body, comprises a bobbin trunk, around the outer perimeter of which a fishing line is wound; a first flange portion, which is on the first side plate side of the bobbin trunk with a larger diameter than the bobbin trunk and which has a first cylindrical surface that is disposed to face the inner perimeter portion of the first side plate and that extends toward the first side plate side; and a second flange portion, which is on the second side plate side of the bobbin trunk with a larger diameter than the bobbin trunk. The first side plate has a groove portion that is formed recessed radially outwardly in at least a portion of the inner perimeter surface that faces the first cylindrical surface.

In this dual-bearing reel, since a groove portion is formed on the inner perimeter surface of the first side plate that faces the first cylindrical surface, the gap between the inner perimeter surface of the first side plate and the outer perimeter surface of the first cylindrical surface is large in the portion where the groove portion is formed. The area where the inner perimeter surface of the first side plate and the outer perimeter surface of the first cylindrical surface overlap with a slight gap is thereby reduced, and a water film is less likely to form. Even if seawater were to enter this gap and a water film were to form, since a water film can not be formed in the portion where the groove portion is formed, the amount of water film can be minimized, and when dry (evaporated), crystallization of the solute can be kept to a minimum, and penetration of seawater into the reel body due to water film can also be suppressed.

Preferably, the second flange portion further comprises a second cylindrical surface that is disposed to face the inner perimeter portion of the second side plate extending on the second side plate side, and the first cylindrical surface extends to a greater length than the second cylindrical surface in the axial direction. In this case, since a groove portion is formed on the first side plate in which the area where the side plate of the reel body and the cylindrical surface overlap in the axial direction becomes large, it is possible to greatly reduce the area where a water film is formed.

Preferably, the groove portion is formed along the circumferential direction of the first side plate. In this embodiment, it is possible to reduce the area where a water film is formed along the circumferential direction. Furthermore, the groove portion acts as a flow channel for moisture, such as seawater, etc., which would flow in the circumferential direction and be drained to the outside of the reel body.

Preferably, the first side plate has a thumbing guide surface that is formed by cutting out material so as to be proximate to the first cylindrical surface of the first flange portion, in at least a portion of the front side and on the outer edge that is below the center of rotation of the spool. In this embodiment, when the reel body is held, it is possible to carry out a thumbing operation with the index finger or the middle finger; therefore, it is possible to carry out a thumbing operation with more sensitivity, compared with the carrying out of a thumbing operation with only the thumb. Additionally, since the end portion of the groove portion in the circumferential direction more closely approaches the thumbing guide surface, the moisture that flows along the circumferential direction can be drained off by the thumbing guide surface, where the groove portion acts as a flow channel, to facilitate drainage.

Preferably, the groove portion is formed on the inner perimeter surface of the first side plate along the circumferential direction in an area other than the portion of the inner perimeter surface of the first side plate where the thumbing guide surface is formed. In this embodiment, it is possible to shorten the processing time of the groove portion.

Preferably, the reel body further includes a handle that is rotatably disposed on the second side plate side. In this embodiment, since a groove portion is disposed on the first side plate side of the reel body on which the handle is not disposed, that is, on the side of the hand that holds the reel (on the side of the hand that carries out thumbing), it is possible to efficiently prevent the formation of water film and residues, even if the area where the side plate of the reel body and the cylindrical surface overlap in the axial direction becomes large due to a thumbing operation.

According to the present invention, it is possible to reduce the area of the water film that forms between the flange portion of the spool and the reel body.

DETAILED DESCRIPTION OF THE EMBODIMENTS

Figure 1:
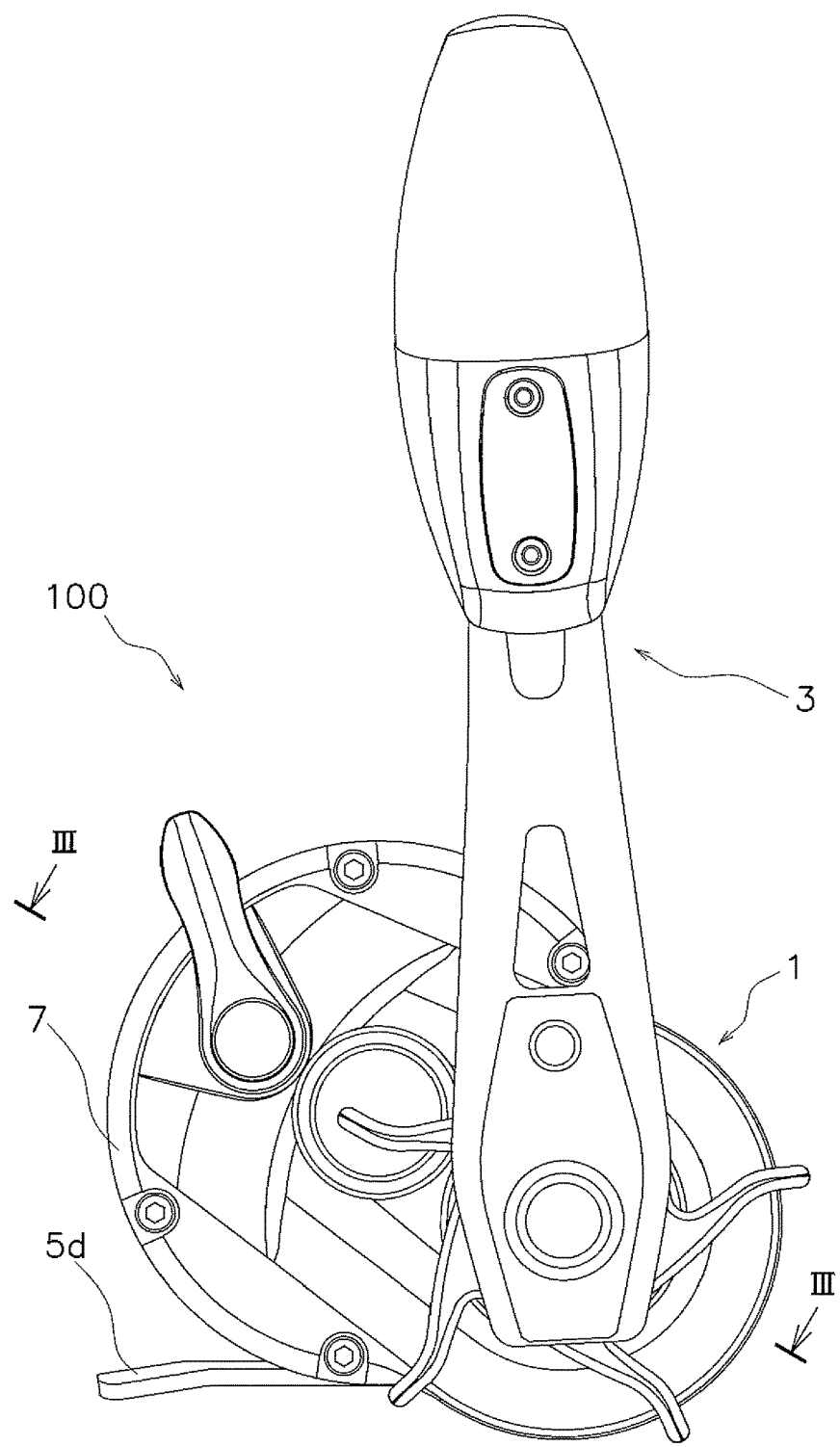
FIG. 1 is a side view of a dual-bearing reel employed in one embodiment of the present invention.
Figure 2:
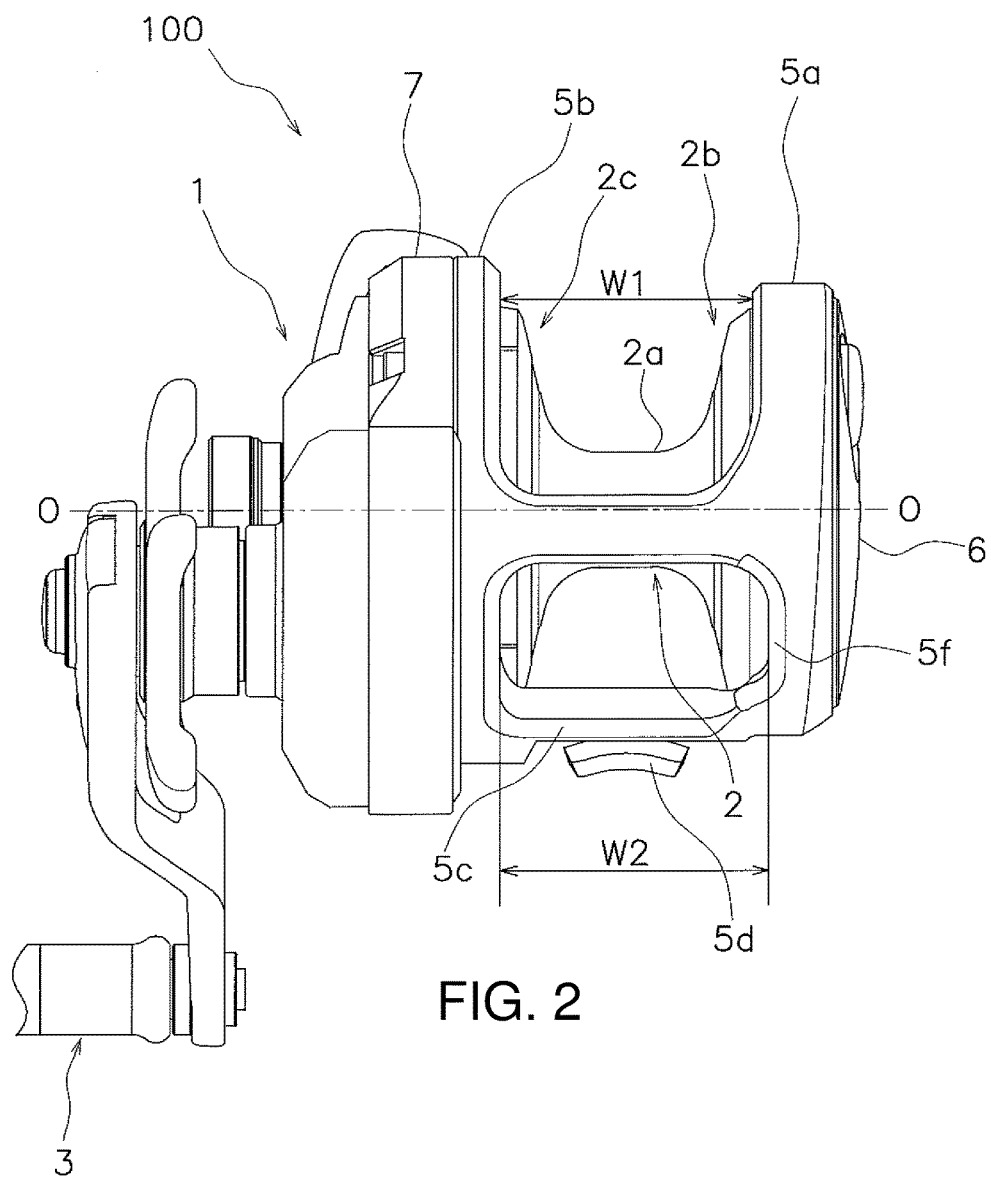
FIG. 2 is a front view of the dual-bearing reel employed in one embodiment of the present invention.
Figure 3:
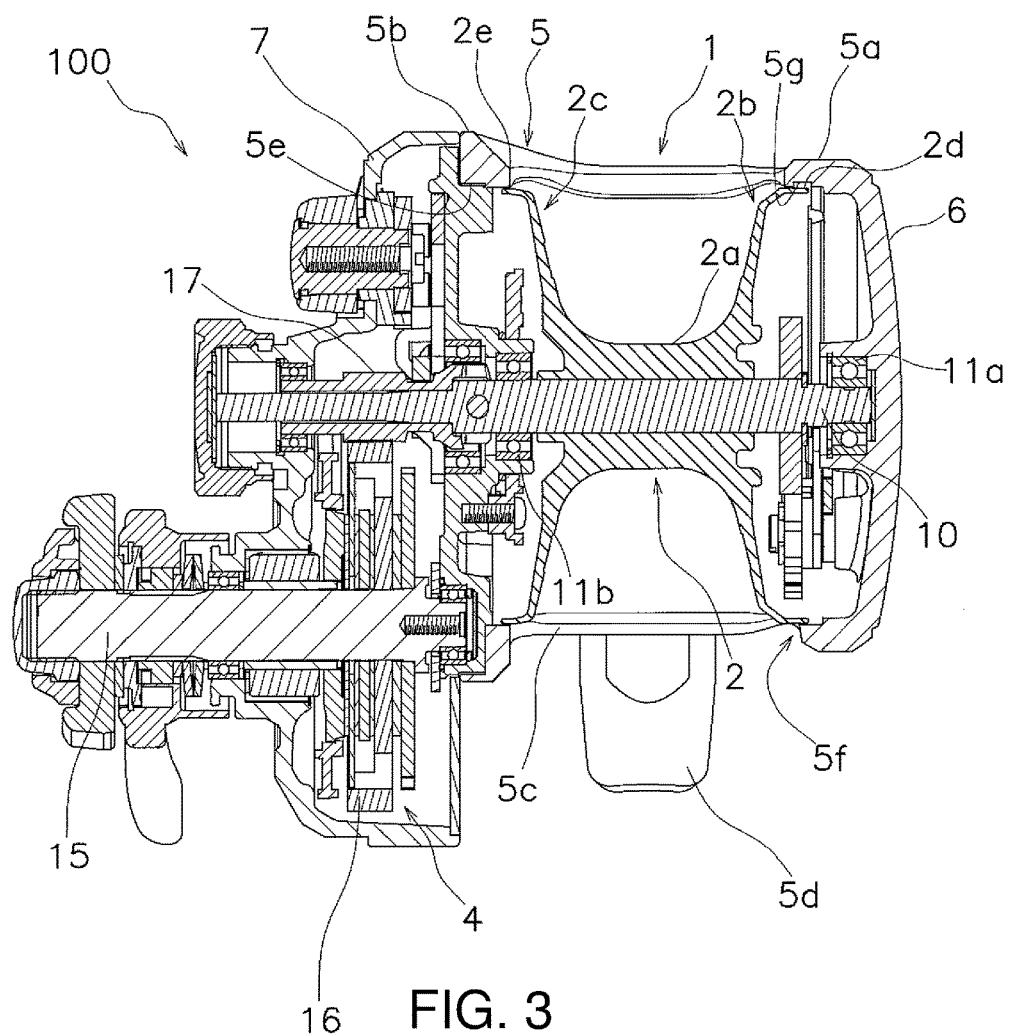
FIG. 3 is a cross-sectional view taken along line III-III of FIG. 1.

As shown in FIGS. 1, 2, and 3, the dual-bearing reel 100 in which one embodiment of the present invention is employed comprises a reel body 1, a spool 2, a handle 3, and a rotation transmission mechanism 4. FIG. 2 is a view of the dual-bearing reel 100 as seen from the front.

The reel body 1 comprises a frame 5, a first side cover 6 and a second side cover 7, which are mounted to cover both sides of the frame 5.

The frame 5 comprises a first side plate 5a, a second side plate 5b that is formed at a predetermined interval from the first side plate 5a, a plurality of connecting portions 5c that connect the first side plate 5a and the second side plate 5b, and a rod mounting portion 5d for the mounting of a fishing rod.

The first side plate 5a is integrally formed with the first side cover 6. The first side plate 5a comprises a thumbing guide surface 5f and a groove portion 5g. The thumbing guide surface 5f is formed by cutting out material so as to be proximate to the outer edge of the spool 2. The groove portion 5g is formed recessed radially outwardly from the inner perimeter surface of the second side plate 5b. Details of this thumbing guide surface 5f and the groove portion 5g are described further below.

The second side plate 5b is a substantially disk-shaped member in which is formed an opening 5e for removal of the spool 2.

The spool 2 is rotatably disposed between the first side plate 5a and the second side plate 5b. As shown in FIG. 3, the spool 2 is fixed to a spool shaft 10 that extends through the center of the spool 2 and rotates integrally with the spool shaft 10. The spool shaft 10 is rotatably supported by the reel body 1 by axle bearings 11a, 11b, disposed in the reel body 1.

The spool 2 comprises a bobbin trunk 2a, a first flange portion 2b, and a second flange portion 2c. The bobbin trunk 2a has a cylindrical shape, and a fishing line can be wound on the outer perimeter thereof.

The first flange portion 2b is formed on the first side plate 5a side of the bobbin trunk 2a to have a larger diameter than the outer diameter of the bobbin trunk 2a. The first flange portion 2b comprises a first cylindrical surface 2d.

The first cylindrical surface 2d is disposed at the distal end of the first flange portion 2b and extends toward the first side plate 5a side. The first cylindrical surface 2d is formed as a cylindrical surface that is parallel to the spool shaft 10. The first cylindrical surface 2d is disposed opposing the inner perimeter portion of the first side plate 5a. The outer perimeter surface of the first cylindrical surface 2d and the inner perimeter surface of the first side plate 5a include a slight gap therebetween, so as to not come into contact with each other.

The second flange portion 2c is formed on the second side plate 5b side of the bobbin trunk 2a and has a larger diameter than the outer diameter of the bobbin trunk 2a. The second flange portion 2c comprises a second cylindrical surface 2e.

The second cylindrical surface 2e is disposed at the distal end of the second flange portion 2c and extends toward the second side plate 5b side. The second cylindrical surface 2e is formed as a cylindrical surface that is parallel to the spool shaft 10. The second cylindrical surface 2e is disposed opposing the inner perimeter portion of the second side plate 5b.

Figure 4:
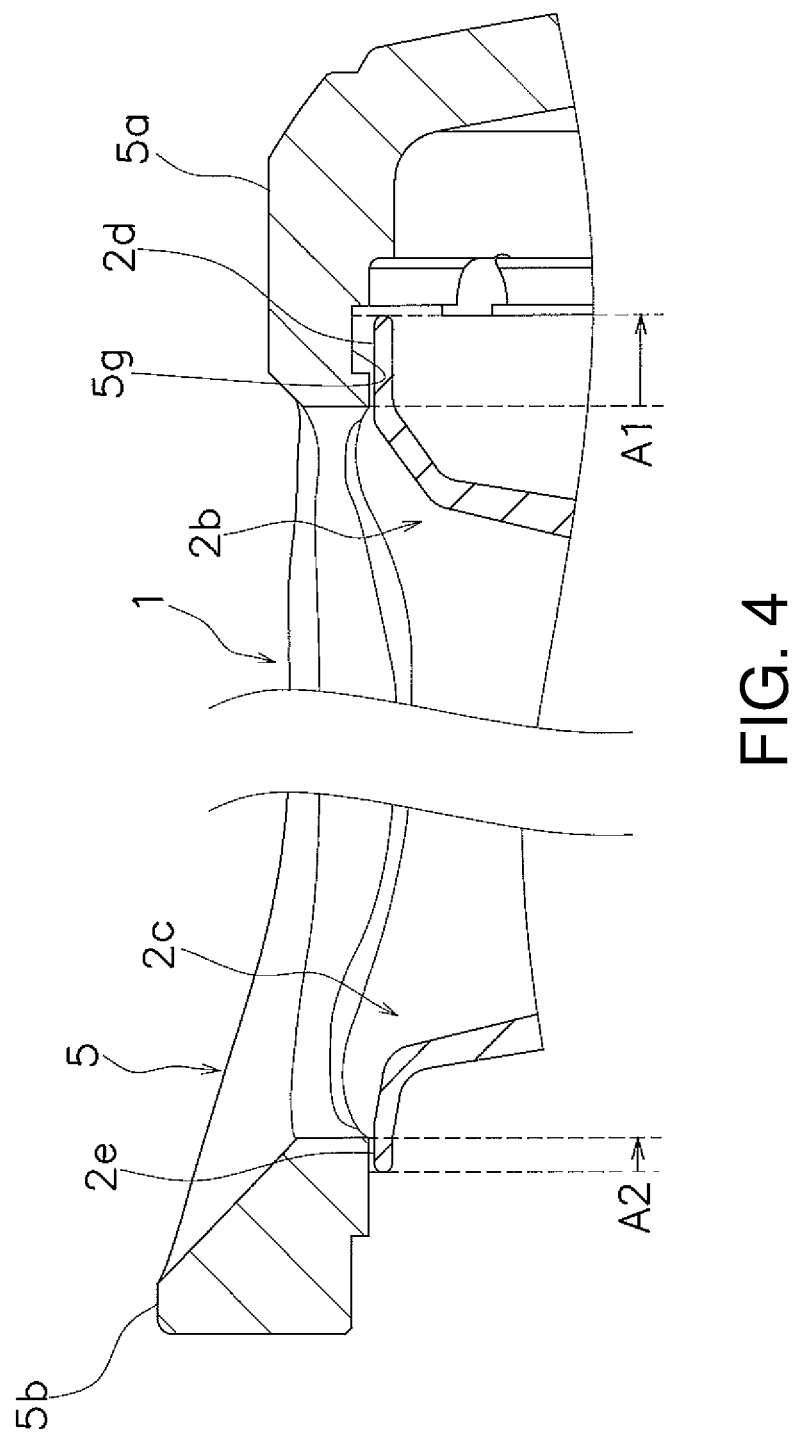
FIG. 4 is an enlarged view of a portion of FIG. 2.

As shown enlarged in FIG. 4, the second cylindrical surface 2e is formed with a shorter axial length than the first cylindrical surface 2d. In other words, the first cylindrical surface 2d extends axially outwardly to a greater length than the second cylindrical surface 2e. Thus, the area A1 where the outer perimeter surface of the first cylindrical surface 2d and the inner perimeter surface of the first side plate 5a overlap in the axial direction is configured to be larger than the area A2 where the outer perimeter surface of the second cylindrical surface 2e and the outer perimeter surface of the second side plate 5b overlap in the axial direction. Moreover, the outer perimeter surface of the second cylindrical surface 2e and the inner perimeter surface of the second side plate 5b include a slight gap therebetween, so that they do not come into contact with each other.

The handle 3 is disposed on the second side plate 5b side of the reel body 1. Specifically, the handle 3 is rotatably mounted on a side portion of the second side cover 7. The spool 2 is rotated via the rotation transmission mechanism 4 by rotating the handle 3.

The rotation transmission mechanism 4 comprises a drive shaft 15, a drive gear 16, and a tubular pinion gear 17. The drive shaft 15 is non-rotatably connected to the handle 3. The drive gear 16 is attached to the drive shaft 15. The pinion gear 17 is mounted around the spool shaft 10 and meshes with the drive shaft 15. The rotation of the drive shaft 15 is transmitted to the pinion gear 17 via the drive gear 16, and the spool 2 is rotated together with the spool shaft 10 by the rotation of the pinion gear 17.

Details of the thumbing guide surface 5f and the groove portion 5g will now be described with reference to FIG. 2-FIG. 5. The thumbing guide surface 5f is formed on the outer edge of the first side plate 5a, which is adjacent to the first flange portion 2b. Specifically, as shown in FIG. 2, the width W2 of the lower front opening between the first side plate 5a and the second side plate 5b is wider on the first side plate 5a side than the width W1 of the upper opening between the first side plate 5a and the second side plate 5b. The thumbing guide surface 5f is disposed on the outer edge of the first side plate 5a, which is adjacent to this widely formed opening.

As shown in FIG. 2 and FIG. 3, the thumbing guide surface 5f is formed by cutting out material so as to be proximate to the first cylindrical surface 2d of the first flange portion 2b, on front side of first side plate 5a and on the outer edge of first side plate 5a that is below the center of rotation O of the spool 2. That is, the thumbing guide surface 5f is formed such that the outer diameter is smaller when approaching the first cylindrical surface 2d of the first flange portion 2b. A portion of the first cylindrical surface 2d is thus exposed from the first side plate 5a in the portion where the thumbing guide surface 5f is formed.

By providing a thumbing guide surface 5f in this manner, it is possible to carry out a thumbing operation by putting the index finger or the middle finger of the hand that grips the reel body 1 in contact with the first cylindrical surface 2d of the first flange portion 2b; therefore, it is possible to carry out a thumbing operation with more sensitivity, compared with the carrying out of a thumbing operation with only the thumb.

Figure 5:
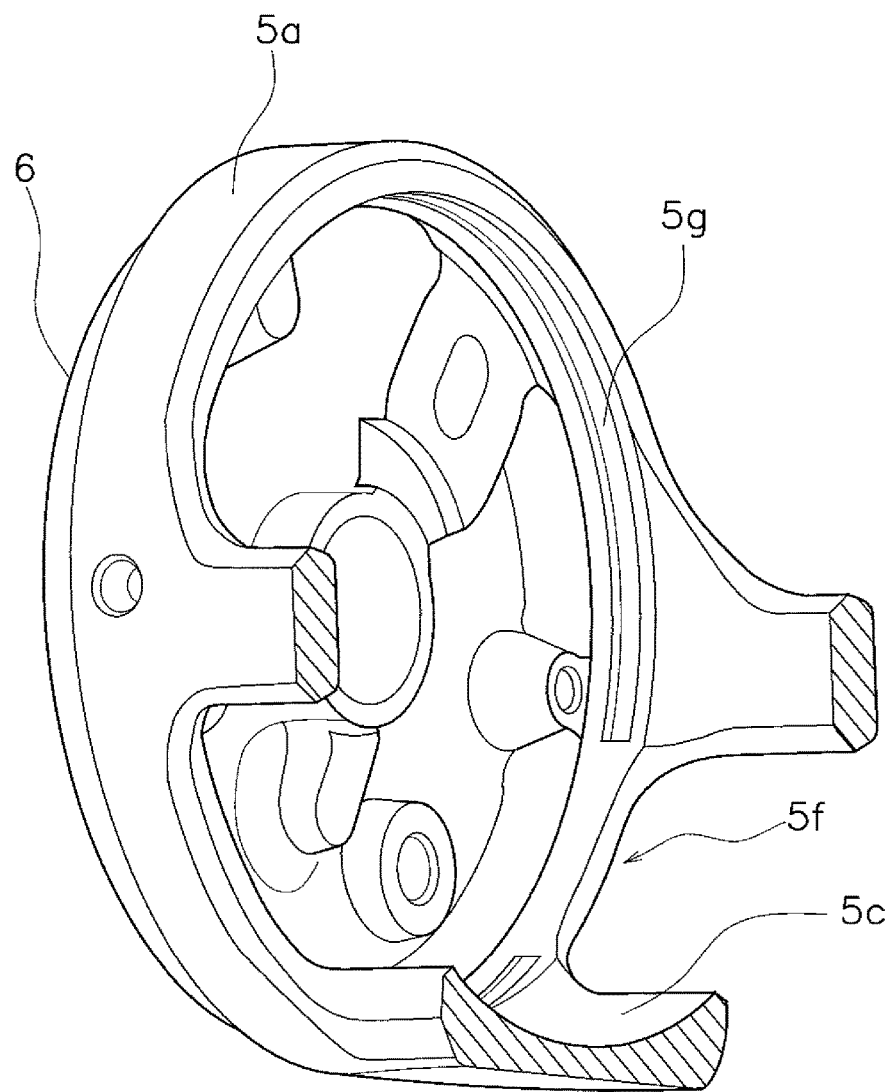
FIG. 5 is a perspective view of the first side plate.

The groove portion 5g is formed in at least a portion of the inner perimeter surface of the first side plate 5a, which faces the first cylindrical surface 2d of the first flange portion 2b. Specifically, as shown in FIG. 4, the groove portion 5g is formed to be recessed radially outwardly from the inner perimeter surface of the first side plate that faces the distal end side of the first cylindrical surface. The groove portion 5g is formed with a cutting tool such as a T slot tool. As shown in FIG. 5, the groove portion 5g is formed on the inner perimeter surface of the first side plate 5a along the circumferential direction. Here, the groove portion 5g is formed on the inner perimeter surface of the first side plate 5a along the circumferential direction in an area other than the portion of the inner perimeter surface of the first side plate 5a where the thumbing guide surface 5f is formed.

As shown in FIG. 4, the portion where the groove portion 5g is formed has a larger gap in the radial direction between the inner perimeter surface of the first side plate 5a and the outer perimeter surface of the first cylindrical surface 2d, compared with the portion where the groove portion 5g is not formed. Thus, the area where the inner perimeter surface of the first side plate 5a and the outer perimeter surface of the first cylindrical surface 2d overlap is reduced, so that a water film is less likely to be formed. Even if seawater were to enter this gap and a water film were to form, since a water film will not be formed in the portion where the groove portion 5g is formed, the amount of water film can be minimized. In addition, even when the water film dries (evaporates), the crystallization of the solute can be kept to a minimum, and penetration of seawater into the reel body 1 due to water film can also be suppressed.

Furthermore, in embodiments described herein, since the groove portion 5g is formed on the inner perimeter surface of the first side plate 5a along the circumferential direction, it is possible to reduce the area where water film is formed along the circumferential direction. Moreover, the groove portion 5g acts as a flow channel for moisture, such as seawater, and the seawater, etc., would flow in the circumferential direction and easily drain from the reel body 1 to the outside. Moreover, since the end portion of the groove portion 5g in the circumferential direction more closely approaches the thumbing guide surface 5f, the moisture that flows in the circumferential direction can be drained off by the thumbing guide surface 5f, where the groove portion 5g acts as a flow channel, to facilitate drainage.

In addition, the groove portion 5g is disposed on the side of the first side plate 5a of the reel body 1 on which the handle 3 is not disposed; that is, the groove portion 5g is disposed on the side of the hand that holds the reel body 1 (on the side of the hand that carries out thumbing). It is thereby possible to efficiently prevent the formation of water film and residues, even if the area where the inner perimeter surface of the first side plate 5a and the outer perimeter surface of the first cylindrical surface 2d overlap in the axial direction is large in order to secure a thumbing space.

Here, a groove portion 5g is not formed on the inner perimeter surface of the first side plate 5a where the thumbing guide surface 5f is formed. This is because, as shown in FIG. 3, the portion where the thumbing guide surface 5f is formed has a small area where the inner perimeter surface of the first side plate 5a and the outer perimeter surface of the first cylindrical surface 2d overlap in the axial direction, so that there is no need to form a groove portion 5g.

Other Embodiments

An embodiment of the present invention was described above, but the specific configurations are not limited to these embodiments, and modifications can be made without departing from the scope of the invention.

In the embodiment described above, a thumbing guide surface 5f is disposed on the first side plate 5a, but it is not necessary to provide a thumbing guide surface 5f. In this embodiment, a groove portion 5g may be formed in an annular shape along the circumferential direction.

The position, shape, or the like of the groove portion 5g that is formed on the inner perimeter surface of the first side plate 5a may be appropriately changed, depending on the shape, etc., of the reel body 1 and the spool 2.

The embodiment described above is configured such that the area where the inner perimeter surface of the first side plate 5a and the outer perimeter surface of the first cylindrical surface 2d overlap in the axial direction is large; however, in a configuration in which the area where the second side plate 5b and the second cylindrical surface 2e, which are on the side on which the handle 3 is mounted, overlap in the axial direction is large, a groove portion 5g may be formed on the inner perimeter surface of the second side plate 5b. In addition, as long as the configuration is such area where both the first cylindrical surface 2d and the second cylindrical surface 2e are extended in the axial direction and overlap the first side plate 5a and the second side plate 5b is large, a groove portion 5g may be formed in both the first side plate 5a and the second side plate 5b.

What is claimed is:
1. A dual-bearing reel, comprising:
a reel body including a first side plate, a second side plate spaced apart from the first side plate in an axial direction, and a connecting portion connecting the first side plate and the second side plate, and a spool rotatably supported in the reel body, and including a bobbin trunk, an outer perimeter, around which a fishing line is capable of being wound, a first flange portion, and a second flange portion, the first flange portion being disposed on a first side plate side of the bobbin trunk, and having a diameter larger than a diameter of the bobbin trunk and a first cylindrical surface disposed to face an inner perimeter portion of the first side plate and extending toward the first side plate side, and the second flange portion being disposed on a second side plate side of the bobbin trunk and having a diameter larger than the diameter of the bobbin trunk, the first side plate having a groove portion recessed radially outwardly in at least a portion of an inner perimeter portion that faces the first cylindrical surface, the groove configured to act as a flow channel for moisture, such that water is capable of flowing in a circumferential direction of the first side plate and drain from the reel body.

2. The dual-bearing reel recited in claim 1, wherein the groove portion is disposed along the circumferential direction of the first side plate.

3. The dual-bearing reel recited in claim 1, wherein the first side plate has a thumbing guide surface formed by cutting out material so as to be proximate to the first cylindrical surface of the first flange portion, in at least a portion of a front side and on an outer edge that is below a center of rotation of the spool.

4. The dual-bearing reel recited in claim 1, further comprising
a handle rotatably disposed on the second side plate side of the reel body.

5. A dual-bearing reel, comprising:
a reel body including a first side plate, a second side plate spaced apart from the first side plate in an axial direction, and a connecting portion connecting the first side plate and the second side plate, and
a spool rotatably supported in the reel body, and including a bobbin trunk, an outer perimeter, around which a fishing line is capable of being wound, a first flange portion, and a second flange portion, the first flange portion being disposed on a first side plate side of the bobbin trunk, and having a diameter larger than a diameter of the bobbin trunk and a first cylindrical surface disposed to face an inner perimeter portion of the first side plate and extending toward the first side plate side, and the second flange portion being disposed on a second side plate side of the bobbin trunk and having a diameter larger than the diameter of the bobbin trunk, the first side plate having a groove portion recessed radially outwardly in at least a portion of an inner perimeter portion that faces the first cylindrical surface, the second flange portion further comprising a second cylindrical surface disposed opposing an inner perimeter portion of the second side plate extending toward the second side plate side, and the first cylindrical surface extends longer than the second cylindrical surface in the axial direction.

6. The dual-bearing reel recited in claim 3, wherein
a reel body including a first side plate, a second side plate spaced apart from the first side plate in an axial direction, and a connecting portion connecting the first side plate and the second side plate, and
a spool rotatably supported in the reel body, and including a bobbin trunk, an outer perimeter, around which a fishing line is capable of being wound, a first flange portion, and a second flange portion, the first flange portion being disposed on a first side plate side of the bobbin trunk, and having a diameter larger than a diameter of the bobbin trunk and a first cylindrical surface disposed to face an inner perimeter portion of the first side plate and extending toward the first side plate side, and the second flange portion being disposed on a second side plate side of the bobbin trunk and having a diameter larger than the diameter of the bobbin trunk, the first side plate having a groove portion recessed radially outwardly in at least a portion of an inner perimeter portion that faces the first cylindrical surface, and a thumbing guide surface formed by cutting out material so as to be proximate to the first cylindrical surface of the first flange portion, in at least a portion of a front side and on an outer edge that is below a center of rotation of the spool, and the groove portion being disposed on the inner perimeter portion of the first side plate along a circumferential direction in a portion of the inner perimeter portion of the first side plate where the thumbing guide surface is formed.

* * * * *